Jan. 28, 1958 P. H. SECKEL 2,821,155
PROCESS OF APPLYING PROTECTIVE COATINGS
Filed Dec. 11, 1953
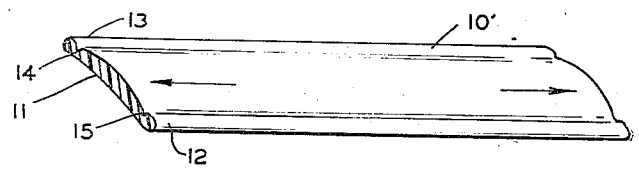
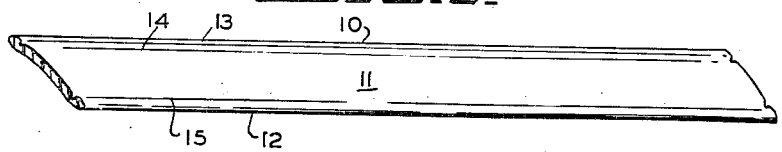
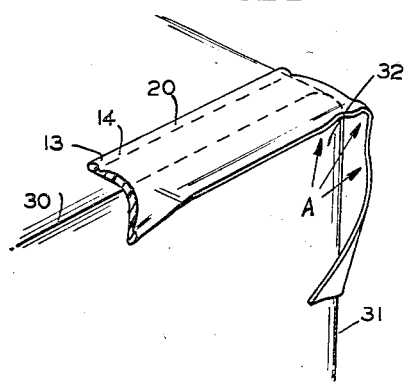
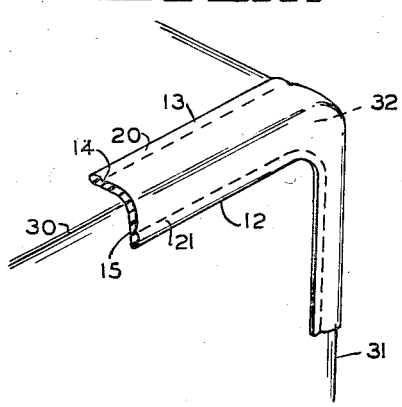
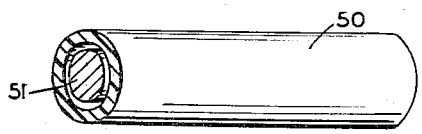
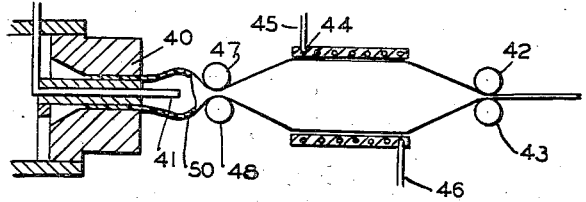
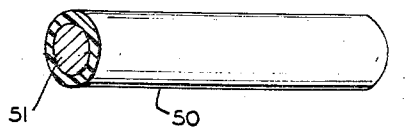
INVENTOR.
PETER H. SECKEL
BY
Greene, Pinella & Durr
ATTORNEYS

United States Patent Office 2,821,155
Patented Jan. 28, 1958

2,821,155
PROCESS OF APPLYING PROTECTIVE COATINGS

Peter H. Seckel, Forest Hills, N. Y., assignor to Richard A. Fisch, Long Island City, N. Y.

Application December 11, 1953, Serial No. 397,568

2 Claims. (Cl. 112—262)

This invention relates to a novel process of applying thermoplastic products which are capable of showing an appreciable elastic recovery after stretching and subsequent heating, to non-planar linear surfaces and to the resultant product.

Among the objects of the invention is to provide a method for covering tubes, rods or similarly shaped bodies or the edges of irregularly shaped bodies made of wood, metal, leather, etc., with a plastic film which tightly adheres thereto.

Among other objects of the invention is to provide a method of applying protective reinforcing plastic strips to curved edges such as found in luggage, boxes and similar containers.

These objects and others ancillary thereto are obtained by providing the desired thermoplastic covering, reinforcing or protective material, stretching and setting thermoplastic material to provide it with an elastic memory, maintaining the stretched material at a temperature at which complete elastic recovery does not take place, positioning the thermoplastic material on the body to be covered or protected thereby and finally heating the thermoplastic protective material to cause it to shrink to the form desired.

The above described objects and others ancillary thereto will be best understood from the following description of exemplifications of the same when read in connection with the accompanying drawing in which Fig. 1 shows an extruded tape of thermoplastic material particularly suited for the reinforcement and protection of the edges of a piece of luggage.

Fig. 2 shows the tape of Fig. 1 after it has been stretched.

Figs. 3 and 4 illustrate steps in the process of applying such tape to a curved edge to be protected by the tape.

Fig. 5 shows a process of making a thermoplastic tube having elastic memory.

Figs. 6 and 7 illustrate the process of using the stretched tube to cover a metal rod.

Heretofore tubes of regenerated cellulose which have been maintained in a moist state have been shrunk onto bottle tops, etc. The process of enclosing irregular articles of food in a stretched bag of thermoplastic material by the aid of a vacuum has also been employed.

According to the present invention only those materials capable of retaining a substantial degree of elastic memory such as certain of the vinyl polymers are employed. These polymers include the after-chlorinated polyvinyl chloride, the copolymers of vinyl chloride and vinyl acetate, polyethylene, etc. Strips or tubes of these products can be partially heated and stretched and cooled in this position whereupon they retain substantially all of the length or dimensions of the cold drawn product until heated. Upon heating the drawn products return to their original configuration if not restrained. Cold drawn polyethylene products must be heated almost to the melting point to cause them to shrink whereas the cold drawn vinyl polymers tend to return to their original shape at temperatures below the melting point.

Figs. 1–4 show a type of material applied to bind and reinforce the edges of luggage, for example. The polyvinyl material, for example, is extruded in the form of tape 10' of Fig. 1. The tape 10' has the central body portion 11, two beaded side edges 13 and 14 separated by the grooves 14 and 15 as a guide to the sewing thread. The strip 10' is heated, drawn and cooled to stretch it to the form 10 shown in Fig. 2.

The side edge 13 of the resultant drawn tape is then sewed parallel to edges 30, 31 to be covered as by the threads 20 (Fig. 3). The opposite edge 12 is bent over in the areas adjacent the curve or corner 32. It will be noted then in bending the tape 10 at the area of corner 32 that puckers tend to form at the regions where arrows A of Fig. 3 point. However, by heating the tape until it reaches the shrinking temperature the tape will be caused to tightly grip the corner 32 as shown in Fig. 4 whereupon the stitching 21 at the opposite edge 12 is completed.

Fig. 5 illustrates diagrammatically one method of making an extended tubing. In Fig. 5 the plastic material is extruded through a die 40 to form tube 50. A certain pressure is maintained inside the freshly extruded tube by means of air pressure jet 41. The tube is collapsed by collapsing rollers 47, 48 and is then stretched by a fluid bubble between the first set of collapsing rollers 47, 48 and the second set of collapsing rollers 42, 43. The tube is forced to expand by the pressure of said fluid bubble and the expansion is controlled by the cylinder 44 which may be cooled by a system of pipes 45, 46.

The tube 50 is expanded sufficiently to be slipped onto the rod 51 to be covered and to give it an elastic memory to enable it to shrink to a slightly smaller diameter than the rod 51. After the tube is in place on the rod heating the tube causes it to shrink upon the rod 51.

The tube of Fig. 5 is stretched while it still is in a heated condition. In the case of the tape of Figs. 1 and 2 the tape may also be slightly heated to facilitate stretching. In some cases, however, the first part of the stretching itself generates enough heat to facilitate further stretching.

For a rod 1" in diameter, for example, a very satisfactory tube is one which has a diameter of ¾" when extruded at the extension head and is then stretched to a diameter of 1.050" from which it shrinks slightly to a diameter of .9". Although the rod 51 is shown as circular in cross section it is obvious that it may have any desired cross sectional shape.

A very satisfactory way to heat the tube after placing it on the rod or other body to be covered is to apply radiant heat, place the assembly in hot air oven, in hot fluids, etc.

The process can be operated in the absence of moisture and provides a tube or covering that provides a substantially corrosion-proof, abrasion resistant and colorful covering that will not scratch or snag objects with which it comes in contact. Thus the covering is superior and more economical than that obtained by galvanizing, electroplating, painting or enameling.

I claim:

1. A process for applying protective material to at least two, corner-connected, edge regions of a rectilinear article to be protected comprising providing a strip of protective material consisting essentially of a thermoplastic vinyl polymer capable of being given an elastic memory, stretching said strip lengthwise to provide the material with an elastic memory and cooling said strip so that the strip retains its stretched configuration, applying a first side of the stretched strip to one side of the edges to be protected, fixing the applied side of the material to the edge region, folding the strip over the edge and heating the same thereby shrinking it so that the unattached side shrinks around said edges and corners in closely conforming relation, and thereafter fixing the second side of the strip to the corresponding edge region which it covers.

2. A process as claimed in claim 1 wherein the sides of the stretched strip are attached to the edge regions by sewing.

References Cited in the file of this patent

UNITED STATES PATENTS

| | | |
|---|---|---|
| 1,998,356 | Brown | Aug. 16, 1935 |
| 2,027,962 | Currie | Jan. 14, 1936 |
| 2,037,631 | Hultin | Apr. 14, 1936 |
| 2,223,017 | Abrams et al. | Nov. 20, 1940 |
| 2,236,552 | Ushakoff | Apr. 1, 1941 |
| 2,346,613 | Rumsey | Apr. 11, 1944 |
| 2,491,424 | Statler | Dec. 13, 1949 |

OTHER REFERENCES

Cry-O-Vac: Protection for Poultry, Bulletin C-1, (Dewey & Almy Chemical Co., 1940).